June 20, 1967     T. MUSZUMANSKI ETAL     3,326,622
AFOCAL VARIFOCAL SUPPLEMENTARY OBJECTIVE
Filed Dec. 24, 1963
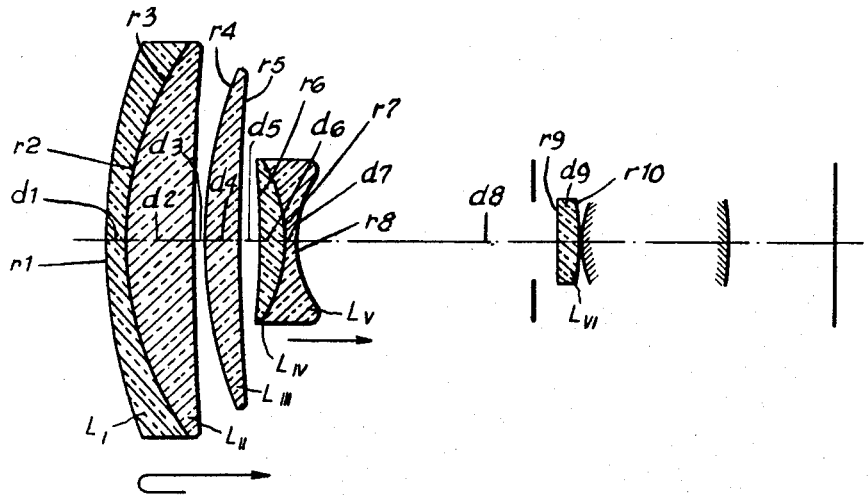

United States Patent Office

3,326,622
Patented June 20, 1967

3,326,622
AFOCAL VARIFOCAL SUPPLEMENTARY
OBJECTIVE
Trude Muszumanski and Berta Mikusch, Vienna, Austria,
assignors to Ing. Karl Vockenhuber, Vienna, Austria
Filed Dec. 24, 1963, Ser. No. 333,055
Claims priority, application Austria, Jan. 11, 1963,
A 210/63
1 Claim. (Cl. 350—184)

The present invention relates to a supplementary objective with constantly variable magnification within the range of about 1:3, for substandard film devices.

The supplementary objective of varifocal lens systems to which the present invention is directed includes a negative lens component which, for varying the magnification is movable along the optical axis relative to the focal plane, and which is located between two positive lens components, the front lens component of which, on moving the negative lens component is moved along the optical axis in such a manner, that the image position remains constant whereas the third lens component, facing the following objective is stationary.

The front lens component of such varifocal lens system has a three-lens, two-membered construction, whereas the negative lens component contains a convergent meniscus to which a biconcave lens is cemented, and the third, positive lens component consists of a single lens, the surface of which, facing the object, is only slightly curved.

In a known supplementary objective having a construction of the above described objective, the front member consists of a convergent meniscus, followed by a cemented member, the cemented surface of which acts converging, but has an extremely slight refractive power only, so that this cemented surface is monochromatic practically ineffective. This leads to a considerable undercorrection of the front lens component which cannot be completely compensated by the following lens components. The mentioned supplementary objective therefor can only be used until a relative aperture of the lens of 1:2.8.

It is one object of the present invention to provide an improved lens system of the varifocal type above indicated wherein this disadvantage is avoided and which enables the supplementary objective to be used for a higher relative aperture of the lens than 1:2.8, preferably higher than 1:2.0. The varifocal lens system of the invention is an improvement over a known construction of the front lens component, in which, in the present invention, the cemented member is located at the first position and includes an object facing diverging meniscus to which a converging meniscus is cemented, the cemented surface is diverging and the third component is a substantially planoconvex lens located at the non-object side of the aperture and having its substantially plane surface facing the aperture. The system is characterized by the following inequalities for the refractive powers and the refractive powers of the surfaces of the positive component in which $\Phi_2$ to $\Phi_5$ mark the refractive power of the individual lens surfaces of the front lens component, $\Phi_{I+II}$ marks the total refractive power of the cemented member and $\Phi_{III}$ marks the refractive power of the single lens of the front lens component:

$$1.5\Phi_{I+II} \leq \Phi_1 \leq 2\ \Phi_{I+II}$$
$$0.4\Phi_{I+II} \leq -\Phi_2 \leq 0.7\Phi_{I+II}$$
$$0 \leq -\Phi_3 \leq 0.4\Phi_{I+II}$$
$$\Phi_{III} \leq \Phi_4 \leq 2\ \Phi_{III}$$
$$0 \leq -\Phi_5 \leq \Phi_{III}$$

With this and other objects in view which will become apparent in the following detailed description, the present invention will be clearly understood in connection with the accompanying drawing of the lens system of the present invention.

Referring now to the drawing, the varifocal lens system according to the present invention comprises a supplementary objective having a movable positive front lens component consisting of three lenses LI, LII and LIII; a fixed positive rear simple substantially planoconvex lens LVI located at the non-object side of an aperture having its substantially plane surface facing the aperture; and a movable negative lens component located between the two aforementioned positive components, lenses LIV–LV, consisting of a convergent meniscus LIV, to which a biconcave lens LV is cemented.

The positive front lens component comprises an object facing cemented doublet LI–LII consisting of a diverging meniscus lens LI, having an object facing surface of radius $r1$, and a converging meniscus lens LII, having a slightly concave rear surface of a radius $r3$. The lenses LI and LII are cemented at an internal contact surface of radius $r2$.

The lens LIII of the positive front lens component is a single converging meniscus with its larger radial surface $r5$ facing the negative lens LIV–LV. Its smaller radial surface $r4$ is spaced a distance on the optical axis from the rear surface $r3$ of the lens LII.

The supplementary objective lens system as described according to the present invention is constructed for 8-mm. substandard film. In connection with a camera main objective having a focal length of 14.7 mm. and a relative aperture of at least 1:1.8, results a varifocal objective with a range of the focal length of 8 to 25 mm. and a relative aperture of maximum 1:1.8.

In accordance with all well-known lens mounting and moving structures for three-part varifocal supplementary objectives, the front positive lens component is variable and the negative lens component LIV–LV, is variable, both components being variable relative the aperture and relative each other along the optical axis in a manner, such that the image position remains constant as indicated by the arrows for each lens component in the drawing.

The following data apply for the system as described, in which $r$ marks the radii, $d$ marks the thicknesses and the air spacings respectively, $n_1$ to $n_6$ mark the refractive indices of the helium yellow $d$-line and $v$ marks the Abbé numbers:

| | | | | |
|---|---|---|---|---|
| $L_I$ | $r_1 = +53.23$ | $d_1=1.8$ | $n_1=1.76$ | $v_1=27$ |
| $L_{II}$ | $r_2 = +31.35$ | $d_2=6.7$ | $n_2=1.62$ | $v_2=60$ |
| | $r_3 = +358.17$ | $d_3=0.5$ | | |
| $L_{III}$ | $r_4=+42.33$ | $d_4=3.5$ | $n_3=1.53$ | $v_3=65$ |
| | $r_5=+192.38$ | $d_5=\begin{cases}2.01\\25.49\end{cases}$ Wide Angle Telephoto | | |
| $L_{IV}$ | $r_6 = -63.92$ | $d_6=2.4$ | $n_4=1.76$ | $v_4=28$ |
| $L_V$ | $r_7=-14.09$ | $d_7=1.0$ | $n_5=1.62$ | $v_5=60$ |
| | $r_8=+10.45$ | $d_8=\begin{cases}24.45\\10.00\end{cases}$ Wide Angle Telephoto | | |
| $L_{VI}$ | $r_9 = \infty$ | $d_9=2.0$ | $n_6=1.62$ | $v_6=60$ |
| | $r_{10}=-30.55$ | | | |

As a result of the above described cooperative construction of the positive front lens component and the negative lens component all image defects may be reduced to a value which is so slight that it may be neglected and which furthermore is independent of the adjusted magnification of the supplementary objective. The construction of the two above mentioned lens components permits a simple planoconvex lens to be provided as the third lens component, the plane surface of this planoconvex lens facing the diaphragm which is arranged between the second and the third lens component.

While we have disclosed one embodiment of the present invention, it is to be understood that this embodiment is given by example only and not in a limiting sense, the scope of the present invention being determined by the objects and the claim.

We claim:

An afocal varifocal type of mechanically compensated supplementary objective for attachment to a photographic objective, having a relative aperture of at least $f/1.8$ said supplementary objective comprising from front to rear a positive meniscus doublet and single meniscus forming a movable front component, a movable negative lens component containing a convergent meniscus to which a biconcave lens is cemented and a stationary planoconvex lens as third lens component, convex to the image plane, said supplementary objective conforming substantially to the following table, in which the dimensions are given in terms of millimeters and proceeding from front to rear $L_I$ to $L_{VI}$ designating said lenses, $r_1$ to $r_{10}$ the radii of curvature of the surfaces, $d_1$ to $d_9$ the axial thicknesses and separations, $n_1$ to $n_6$ the indices of refraction for the helium yellow $d$-line and $v_1$ to $v_6$ the Abbé numbers:

| | | | | |
|---|---|---|---|---|
| $L_I$ | $r_1 = +53.23$ | $d_1=1.8$ | $n_1=1.76$ | $v_1=27$ |
| $L_{II}$ | $r_2 = +31.35$ | $d_2=6.7$ | $n_2=1.62$ | $v_2=60$ |
| | $r_3 = +358.17$ | $d_3=0.5$ | | |
| $L_{III}$ | $r_4 = +42.33$ | $d_4=3.5$ | $n_3=1.53$ | $v_3=65$ |
| | $r_5 = +192.38$ | $d_5=\begin{cases}2.01\\25.49\end{cases}$ Wide Angle Telephoto | | |
| $L_{IV}$ | $r_6 = -63.92$ | $d_6=2.4$ | $n_4=1.76$ | $v_4=28$ |
| $L_V$ | $r_7 = -14.09$ | $d_7=1.0$ | $n_5=1.62$ | $v_5=60$ |
| | $r_8 = +10.45$ | $d_8=\begin{cases}24.45\\10.00\end{cases}$ Wide Angle Telephoto | | |
| $L_{VI}$ | $r_9 = \infty$ | $d_9=2.0$ | $n_6=1.62$ | $v_6=60$ |
| | $r_{10}=-30.55$ | | | |

References Cited

UNITED STATES PATENTS 2,844,996  7/1958  Klemt _____ 88—57
3,044,355  7/1962  Cox et al. _____ 88—57

JEWELL H. PEDERSEN, *Primary Examiner.*

R. J. STERN, *Assistant Examiner.*